United States Patent
Ghady et al.

(10) Patent No.: US 8,259,599 B2
(45) Date of Patent: Sep. 4, 2012

(54) SYSTEMS AND METHODS FOR DISTRIBUTED BEAMFORMING BASED ON CARRIER-TO-CAUSED INTERFERENCE

(75) Inventors: Navid Hassanpour Ghady, San Diego, CA (US); Joseph B. Soriaga, San Diego, CA (US); John Edward Smee, San Diego, CA (US); Jilei Hou, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 914 days.

(21) Appl. No.: 12/030,818

(22) Filed: Feb. 13, 2008

(65) Prior Publication Data

US 2009/0201903 A1     Aug. 13, 2009

(51) Int. Cl.
*H04B 7/02* (2006.01)
*H04B 7/216* (2006.01)
*H04B 1/38* (2006.01)
*H04B 15/00* (2006.01)
*H04M 1/00* (2006.01)

(52) U.S. Cl. ........ 370/252; 370/335; 370/342; 342/373; 375/267; 375/285; 375/296; 375/299; 375/346; 375/347; 455/63.1; 455/63.4; 455/501; 455/562.1

(58) Field of Classification Search ........... 370/252, 370/335, 342; 342/373; 375/267, 285, 296, 375/299, 346, 347; 455/63.1, 63.4, 501, 455/562.1
See application file for complete search history.

(56) References Cited

U.S. PATENT DOCUMENTS

| | | | | |
|---|---|---|---|---|
| 6,847,327 B2* | 1/2005 | Ylitalo | | 342/407 |
| 6,862,271 B2* | 3/2005 | Medvedev et al. | | 370/329 |
| 7,042,860 B2* | 5/2006 | Kasami et al. | | 370/334 |
| 7,079,870 B2* | 7/2006 | Vaidyanathan | | 455/562.1 |
| 7,103,384 B2* | 9/2006 | Chun | | 455/562.1 |
| 7,460,611 B2* | 12/2008 | Fujita et al. | | 375/285 |
| 7,602,745 B2* | 10/2009 | Lin et al. | | 370/328 |
| 7,676,007 B1* | 3/2010 | Choi et al. | | 375/347 |
| 7,702,029 B2* | 4/2010 | Kotecha et al. | | 375/267 |
| 7,720,470 B2* | 5/2010 | Shi et al. | | 455/425 |
| 7,738,428 B2* | 6/2010 | Medvedev et al. | | 370/334 |
| 7,738,925 B2* | 6/2010 | Nguyen et al. | | 455/562.1 |
| 7,751,494 B2* | 7/2010 | Borkar et al. | | 375/267 |

(Continued)

FOREIGN PATENT DOCUMENTS

EP     1505741 A2     2/2005

(Continued)

OTHER PUBLICATIONS

Mung Chiang et al., "Power Control in Wireless Cellular Networks", Foundation and Trends® in sample, 2008, pp. 1-156, vol. x, No. y.

(Continued)

*Primary Examiner* — Alpus H Hsu
(74) *Attorney, Agent, or Firm* — Kenyon Jenckes; Mary A. Fales

(57) ABSTRACT

In accordance with a method for distributed beamforming based on carrier to caused interference, a base station may receive channel state information from users. The base station may select a codeword from a codebook. The codeword may be selected so as to maximize a utility function that is based on a signal-to-caused-interference-plus-noise ratio. The base station may use the codeword for beamforming.

70 Claims, 7 Drawing Sheets

U.S. PATENT DOCUMENTS

| | | | |
|---|---|---|---|
| 7,760,800 B2 * | 7/2010 | Bae et al. | 375/233 |
| 7,809,074 B2 * | 10/2010 | Kotecha et al. | 375/267 |
| 7,852,963 B2 * | 12/2010 | Chen et al. | 375/267 |
| 7,917,176 B2 * | 3/2011 | Khojastepour et al. | 455/562.1 |
| 7,949,318 B2 * | 5/2011 | Prasad et al. | 455/129 |
| 2005/0232156 A1 * | 10/2005 | Kim et al. | 370/236 |
| 2006/0030364 A1 * | 2/2006 | Olesen et al. | 455/562.1 |
| 2006/0279460 A1 * | 12/2006 | Yun et al. | 342/377 |
| 2007/0211815 A1 * | 9/2007 | Pan et al. | 375/267 |
| 2007/0280116 A1 | 12/2007 | Wang et al. | |
| 2008/0070564 A1 * | 3/2008 | Li et al. | 455/424 |
| 2008/0080449 A1 * | 4/2008 | Huang et al. | 370/342 |
| 2008/0094281 A1 * | 4/2008 | Teng et al. | 342/368 |
| 2008/0165875 A1 * | 7/2008 | Mundarath et al. | 375/262 |
| 2008/0227495 A1 * | 9/2008 | Kotecha et al. | 455/562.1 |
| 2008/0232503 A1 * | 9/2008 | Kim | 375/267 |
| 2008/0292012 A1 * | 11/2008 | Kim et al. | 375/260 |
| 2008/0317145 A1 * | 12/2008 | Clerckx et al. | 375/260 |
| 2009/0004986 A1 * | 1/2009 | Park et al. | 455/226.3 |
| 2009/0022254 A1 * | 1/2009 | Na et al. | 375/346 |
| 2010/0303002 A1 * | 12/2010 | Zorba Barah et al. | 370/316 |

FOREIGN PATENT DOCUMENTS

| | | |
|---|---|---|
| EP | 1821444 A2 | 8/2007 |
| JP | 2000151484 A | 5/2000 |
| WO | WO2004036791 A1 | 4/2004 |
| WO | WO2007114654 A1 | 10/2007 |

OTHER PUBLICATIONS

Wei Yu et al., "Transmitter Optimization for the Multi-Antenna Downlink with Per-Antenna Power Constraints", IEEE Transactions on Signal Processing, Jun. 2007, pp. 2646-2660, vol. 55, No. 6, part 1.

Ronald A. Iltis et al., "Noncooperative Iterative MMSE Beamforming Algorithms for Ad Hoc Networks", IEEE Transactions on Communications, Apr. 2006, pp. 748-759, vol. 54, No. 4.

Farrokh Rashid-Farrokhi, et al., "Joint Optimal Power Control and Beamforming in Wireless Networks Using Antenna Arrays," IEEE J. Sel. Areas Commun., Oct. 1998, pp. 1313-1324, vol. 46, No. 10.

Tian Lan, et al., Joint Beamforming and Power Control for Optimal SIR Assignment in Cellular Uplinks, Proc. IEEE ISIT, Nice, France, Jun. 2007.

M. Schubert and H. Boche, "Solution of the Multiuser Downlink Beamforming Problem with Individual SINR Constraints," IEEE Trans. Veh. Technol., Jan. 2004, pp. 18-28, vol. 53, No. 1.

International Search Report and Written Opinion—PCT/US2009/033566—ISA/EPO—Nov. 20, 2009 (080687WO).

* cited by examiner

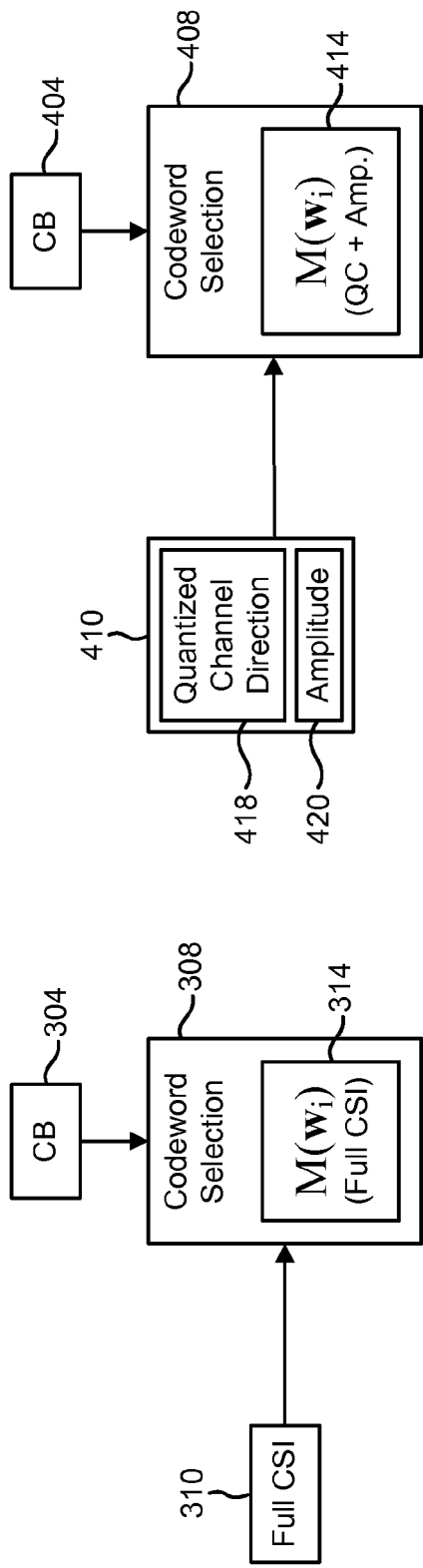
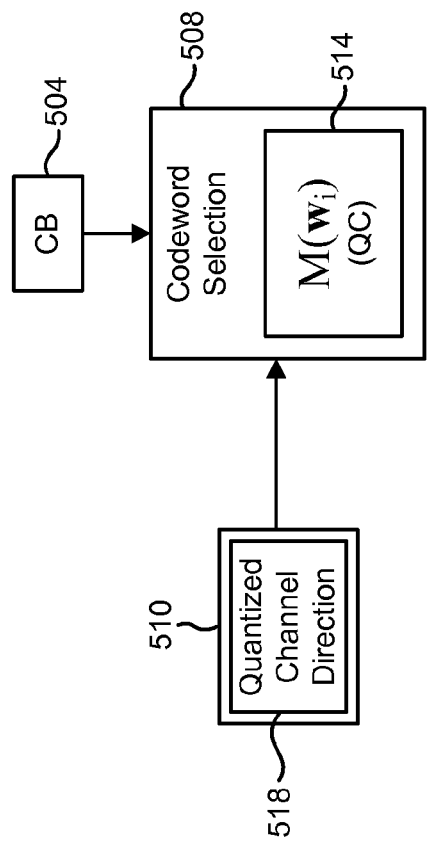
FIG. 3
FIG. 4
FIG. 5

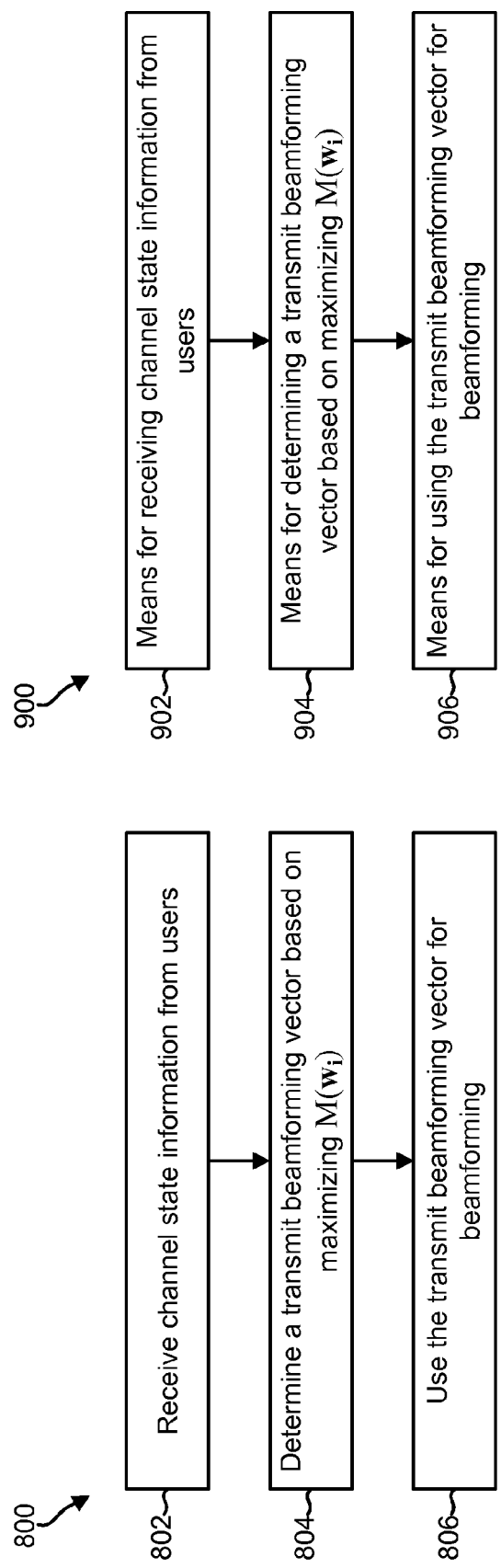

SYSTEMS AND METHODS FOR DISTRIBUTED BEAMFORMING BASED ON CARRIER-TO-CAUSED INTERFERENCE

TECHNICAL FIELD

The present disclosure relates generally to wireless communication systems. More specifically, the present disclosure relates to systems and methods for distributed beamforming based on carrier-to-caused interference.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

BRIEF DESCRIPTION OF THE DRAWINGS

FIG. 3 illustrates an example of channel state information that may be fed back from a user to a base station;

FIG. 4 illustrates another example of channel state information that may be fed back from a user to a base station;

FIG. 5 illustrates another example of channel state information that may be fed back from a user to a base station;

FIG. 8 illustrates a method for distributed beamforming based on carrier-to-caused interference;

FIG. 9 illustrates means-plus-function blocks corresponding to the method of FIG. 8.

DETAILED DESCRIPTION

Figure 1:
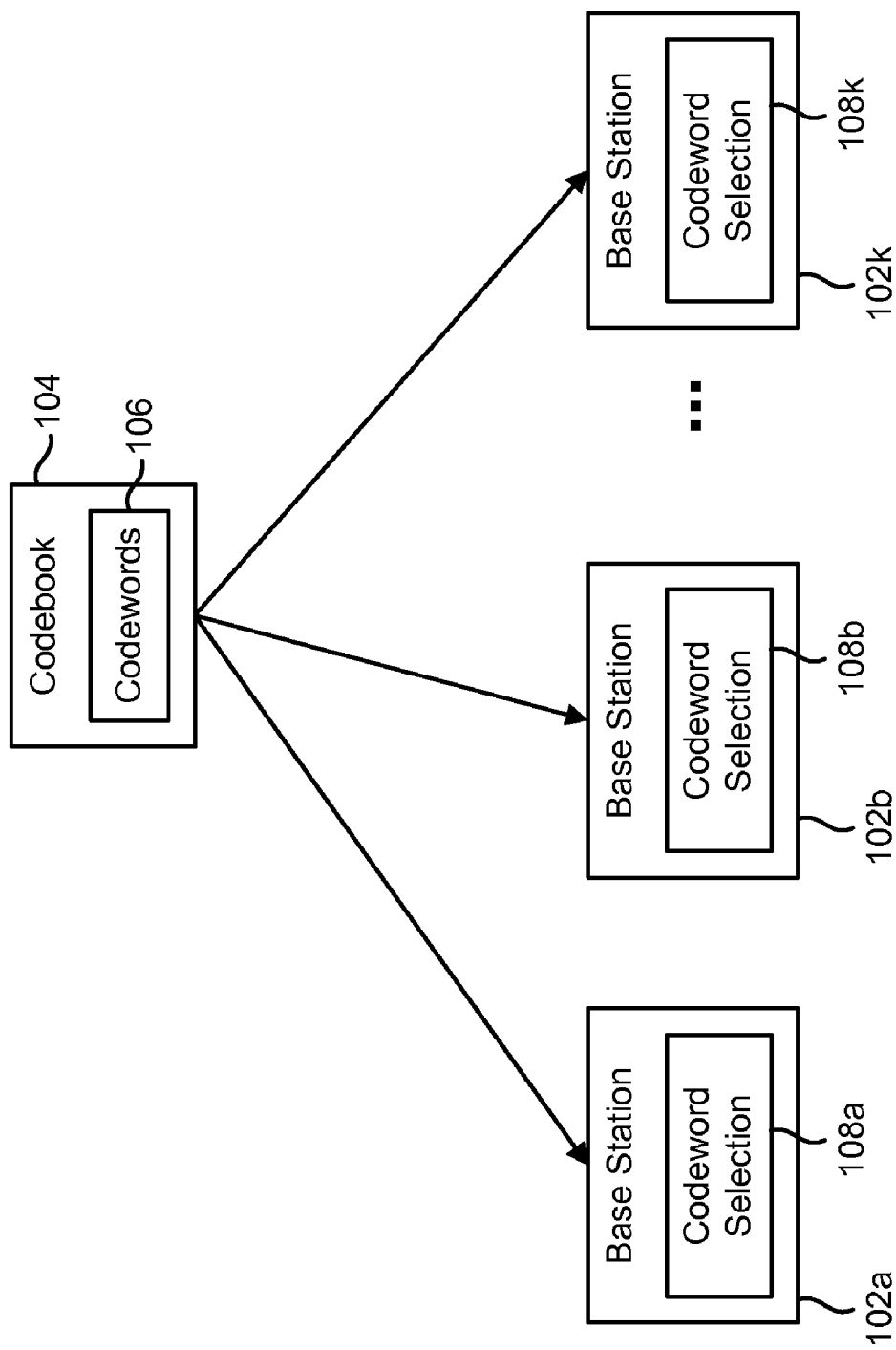
FIG. 1 illustrates base stations that share a codebook and that separately choose a codeword (beamforming vector) from the codebook.

A method for distributed beamforming based on carrier to caused interference is disclosed. In accordance with the method, channel state information may be received from users. A transmit beamforming vector may be determined based on maximizing a utility function that comprises a signal-to-caused-interference-plus-noise ratio. The transmit beamforming vector may be used for beamforming.

A base station configured for distributed beamforming based on carrier to caused interference is also disclosed. The base station comprises a processor, memory in electronic communication with the processor, and instructions stored in the memory. The instructions may be executable to receive channel state information from users. The instructions may also be executable to determine a transmit beamforming vector based on maximizing a utility function that comprises a signal-to-caused-interference-plus-noise ratio. The instructions may also be executable to use the transmit beamforming vector for beamforming.

An apparatus for distributed beamforming based on carrier to caused interference is also disclosed. The apparatus may comprise means for receiving channel state information from users. The apparatus may also comprise means for determining a transmit beamforming vector based on maximizing a utility function that comprises a signal-to-caused-interference-plus-noise ratio. The apparatus may also comprise means for using the transmit beamforming vector for beamforming.

A computer-program product for distributed beamforming based on carrier to caused interference is also disclosed. The computer-program product comprises a computer-readable medium having instructions thereon. The instructions may comprise code for receiving channel state information from users. The instructions may also comprise code for determining a transmit beamforming vector based on maximizing a utility function that comprises a signal-to-caused-interference-plus-noise ratio. The instructions may also comprise code for using the transmit beamforming vector for beamforming.

A wireless communication system may provide communication for a number of cells, each of which may be serviced by a base station. A base station may be a fixed station that communicates with access terminals. A base station may alternatively be referred to as an access point, a Node B, or some other terminology.

Access terminals may be fixed (i.e., stationary) or mobile. Access terminals may alternatively be referred to as user terminals, terminals, subscriber units, remote stations, mobile stations, stations, etc. Access terminals may be wireless devices, cellular phones, personal digital assistants (PDAs), handheld devices, wireless modems, laptop computers, personal computers, etc. A variety of algorithms and methods may be used for transmissions in a wireless communication system between the base stations and the access terminals.

A communication link that facilitates transmission from a base station to an access terminal may be referred to as a forward link, and a communication link that facilitates transmission from an access terminal to a base station may be referred to as a reverse link. Alternatively, a forward link may be referred to as a downlink or a forward channel, and a reverse link may be referred to as an uplink or a reverse channel.

A cell may be divided into multiple sectors. A sector is a physical coverage area within a cell. Base stations within a wireless communication system may utilize antennas that concentrate the flow of power within a particular sector of the cell. Such antennas may be referred to as directional antennas.

The present disclosure proposes a distributed beamforming method using a novel beam selection metric based on Carrier to Caused Interference (C/CI). This method may result in significant performance improvement over known methods (e.g., in terms of the sum rate). The present disclosure also introduces extensions of the distributed beamforming method for variable levels of channel state information (CSI) feedback and multiple receive antennas. Beamforming codebooks with power variations across antennas are also presented herein.

The present disclosure proposes a distributed beamforming method for maximization of an aggregate utility across a wireless cellular network. The present disclosure proposes a scheme that selects the beam which maximizes the ratio of signal power to the noise plus interference caused by the beam in question in adjacent sectors or the sectors in the active set. In accordance with this scheme, the beam selection may be done at the base station instead of the mobile station. Using additional Channel State Information (CSI), the base station may avoid causing interference in adjacent sectors and may considerably improve the performance of the system.

The techniques described herein may be applied in a system in which there exists K base stations, each with N transmit antennas. It may be assumed that each base station is serving a single user with M receive antennas. It may also be assumed that these users are assigned bijectively to the base stations beforehand. It may also be assumed that each base station uses a N×1 vector $w_i$, i=1, ..., K for beamforming to its assigned user. Therefore, the channel may be modeled as:

$$y_i = H_{ii}w_ix_i + n_i + \sum_{j \neq i} H_{ji}w_jx_j \quad i = 1, \ldots, K \quad (1)$$

where $y_i$ and $n_i$ are M×1 vectors, $H_{ji}$ is the M×N channel matrix between user i and base station j, $w_i$ is the N×1 beamforming vector, and the $x_i$ terms are data symbols with power constraints for each base station $E|x_i|^2 < P_i$.

If it is assumed that M=1, then $n_i \sim N(0, N_i)$ and the $y_i$ terms will be scalars. The $H_{ji}$ terms are vectors $h_{ji}$. The Signal to Interference plus Noise Ratio (SINR) may be defined as:

$$SINR_i = \frac{|h_{ii}w_i|^2 P_i}{\sum_{j \neq i}|h_{ji}w_j|^2 P_j + N_i} \quad (2)$$

In practice some of the channel coefficients $h_{ji}$ may be negligible. Therefore the number of interference terms may be equal to the number of users in the active set of the user i, which is usually smaller than the total number of users in the network, K.

The objective may be to maximize a utility function based on SINR by using a distributed algorithm. For example, this may mean maximizing $$\sum_{i=1}^{K} U_i(SINR_i)$$

based on finding $$w_i^* = \underset{w_i}{\operatorname{argmax}} M(w_i)$$

where $M(w_i)$ is a metric function whose optimization is solely over the beamforming vector $w_i$ at the base station i. In other words, the optimization process may be distributed; i.e., each base station may separately choose its own $w_i$.

The present disclosure proposes a metric based on carrier to "caused interference." This metric may be expressed as:

$$M(w_i) = \frac{|h_{ii}w_i|^2 P_i / N_i}{\sum_{j \neq i}|h_{ij}w_i|^2 P_i / N_j + 1} \quad (3)$$

$$M(w_i) = \frac{|h_{ii}w_i|^2 P_i}{\sum_{j \neq i}|h_{ij}w_i|^2 P_i + N} \quad \text{or} \quad M(w_i) = \frac{|h_{ii}w_i|^2}{\sum_{j \neq i}|h_{ij}w_i|^2} \quad (4)$$

The "caused interference" to each user may be scaled by various possible weighting factors before being summed, as shown in equation (4A):

$$M(w_i) = \frac{|h_{ii}w_i|^2 P_i}{\sum_{j \neq i} \alpha_{ij}|h_{ij}w_i|^2 P_i + \alpha_0 N} \quad (4A)$$

where $\alpha_{ij}$ is a weighting factor that may be based on the utility of reducing interference to user j.

Referring to FIG. 1, multiple base stations 102a, 102b, 102k may share a codebook 104 of codewords 106. Each codeword 106 may correspond to a beamforming vector that may be selected. In other words, the codewords 106 may represent possible selections for $w_i$.

Each base station 102a, 102b, 102k may separately choose its own $w_i$. Thus, each base station 102a, 102b, 102k is shown with a codeword selection component 108a, 108b, 108k.

In accordance with the present disclosure, users may send back downlink channel information to all of the base stations in their active set or all of the base stations which cause a significant interference. Thus each base station may receive channel state information (CSI) fed back from its own user(s) plus the user(s) affected by its transmission.

Figure 2:
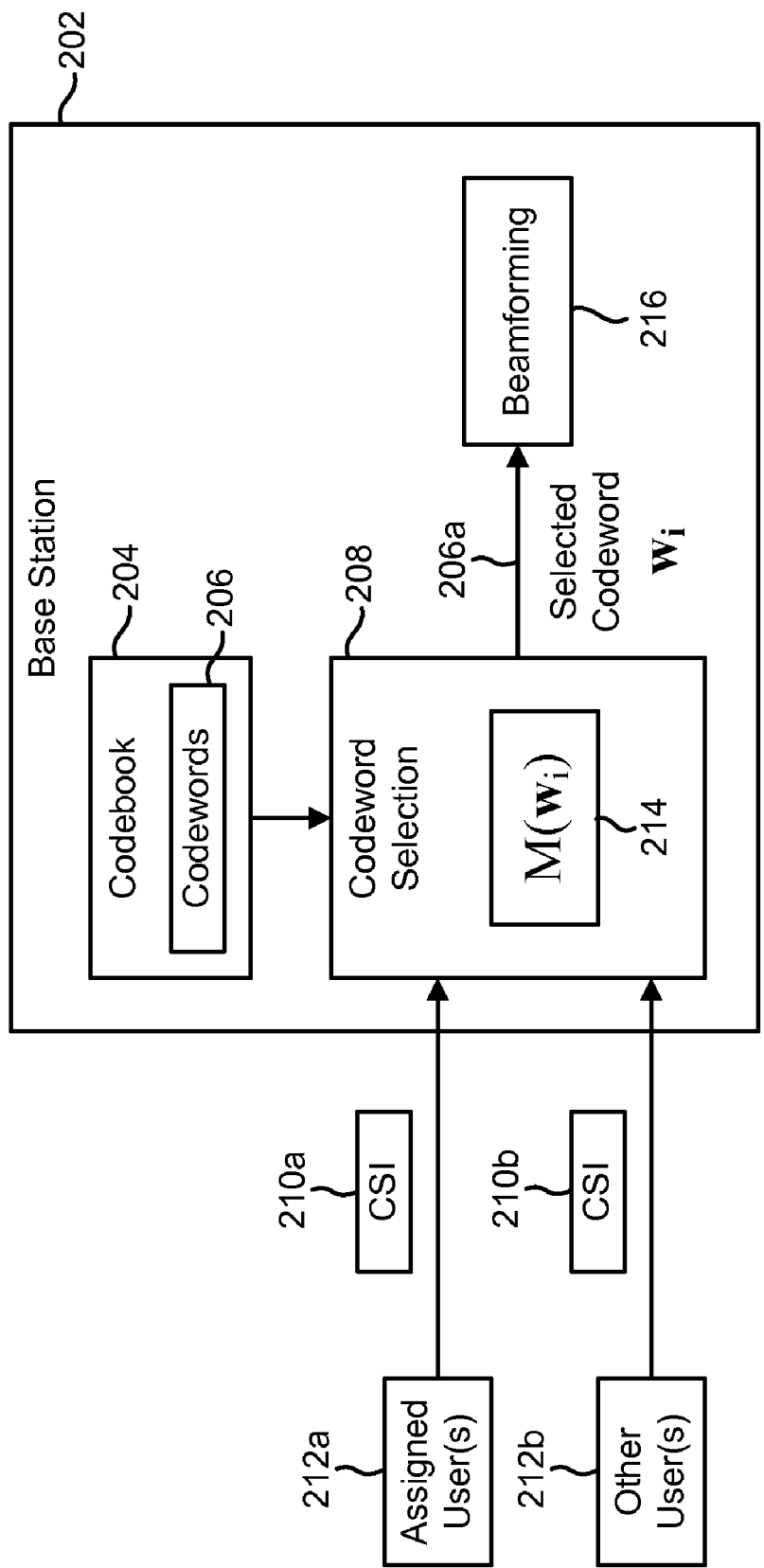
FIG. 2 illustrates how a base station may select a codeword by maximizing a utility function that is based on signal to interference plus noise ratio, where the utility function may take different forms depending on channel state information that is received.

Referring to FIG. 2, a base station 202 is shown receiving channel state information 210a from one or more assigned users 212a. In addition, the base station 202 is shown receiving channel state information 210b from one or more other users 212b that may be affected by the transmissions of the base station 202.

The base station 202 may maximize a utility function $M(w_i)$ 214 that is based on SINR. Stated another way, the base station 202 may choose a codeword 206 (i.e., beamforming vector $w_i^*$) which maximizes the signal to caused interference plus noise ratio. A codeword selection component 208 is shown in FIG. 2 for providing this functionality.

As indicated above, the optimization of $M(w_i)$ 214 may be solely over the beamforming vector $w_i$ at the base station i. As will be described in greater detail below, the utility function $M(w_i)$ 214 may have different forms depending on the channel state information 210 that is received. Examples of the utility function $M(w_i)$ 214 were provided above in equations (3) and (4).

Once a particular codeword 206a (i.e., beamforming vector $w_i$) has been selected, the selected codeword 206a may be used for beamforming. A beamforming component 216 is shown in FIG. 2 for providing this functionality.

Different levels of feedback of channel state information are possible. Some examples of the different levels of feedback will now be discussed. In this discussion, it will be assumed that each user has one receive antenna (i.e., M=1).

Feeding back full channel state information may be practical when the fading is slow and only the changes (innovations) in the channel value are fed back. In this case each base station i may find the $w_i^*$ that maximizes:

$$w_i^* = \underset{w}{\mathrm{argmax}} \frac{|h_{ii} w_i|^2 P_i / N_i}{\sum_{j \neq i} |h_{ij} w_i|^2 P_i / N_j + 1} \qquad (5)$$

This search can be done in the quantized restricted space where there are only $2^n$ codewords available or in the continuous space. The optimal codeword in the quantized space may be found by searching among $2^n$ candidates. The maximizing solution in the continuous space may be the Minimum Mean Square Error (MMSE) solution. Assuming $$B = \sum_{j \neq i} h_{ij}^H h_{ij} \cdot P_i / N_j,$$

the optimal $w_i^*$ may be expressed as:

$$w_i^* = \frac{(I+B)^{-1} h_{ii}}{\|(I+B)^{-1} h_{ii}\|} \qquad (6)$$

When it is not possible to feed back all the channel information to the base stations in the active set, quantized direction plus amplitude can serve as a replacement for the full feedback. In this case, each of the users may feed back a quantized version of the channel (this quantized version may be an element in the fixed codebook) plus the amplitude of the channel to the corresponding base stations. The vectors representing quantized channel direction may be chosen in each user in the following way, $\hat{w}_i = \arg_{w_i} \max |h_{ii} w_i|^2$, i=1, ..., K. The amplitude information $|h_{ii}|^2$ i=1, ..., K may also be fed back. In this case:

$$w_i^* = \underset{w}{\mathrm{argmax}} \frac{|h_{ii}|^2 |\hat{w}_i^H w_i|^2 P_i / N_i}{\sum_{j \neq i} |h_{ij}|^2 |\hat{w}_j^H w_i|^2 P_i / N_j + 1} \qquad (7)$$

When the users have limited abilities in terms of feeding back channel information, it is possible to consider a scenario where only a quantized version of the channel direction is fed back to the base stations in the active set. Base stations may use this quantized channel information to estimate the optimal $w_i^*$ based on carrier to caused interference. In this case:

$$w_i^* = \underset{w}{\mathrm{argmax}} \frac{|\hat{w}_i^H w_i|^2}{\sum_{j \neq i} |\hat{w}_j^H w_i|^2} \qquad (8)$$

or $$w_i^* = \underset{w}{\mathrm{argmax}} \frac{|\hat{w}_i^H w_i|^2 P_i / N_i}{\sum_{j \neq i} |\hat{w}_j^H w_i|^2 P_i / N_j + 1} \qquad (9)$$

In the above metrics it is possible to rewrite the equations omitting the $N_i$ terms. Such an omission may be relevant especially in high SNRs. For example:

$$w_i^* = \underset{w}{\mathrm{argmax}} \frac{|h_{ii} w_i|^2 P_i}{\sum_{j \neq i} |h_{ij} w_i|^2 P_i} \qquad (10)$$

or assuming similar power constraints through the network $$w_i^* = \underset{w}{\mathrm{argmax}} \frac{|h_{ii} w_i|^2}{\sum_{j \neq i} |h_{ij} w_i|^2} \qquad (11)$$

Different levels of channel state information feedback are illustrated in FIGS. 3 through 5. Referring to FIG. 3, when full channel state information 310 is fed back from users, a codeword selection component 308 may select a codeword from a codebook 304 by maximizing a utility function $M(w_i)$ 314 such as the one provided above in equation (5).

Referring to FIG. 4, when the channel state information 410 fed back from users only includes a quantized version of the channel direction 418 and the amplitude 420 of the channel, a codeword selection component 408 may select a codeword from a codebook 404 by maximizing a utility function $M(w_i)$ 414 such as the one provided above in equation (7).

Referring to FIG. 5, when the channel state information 510 fed back from users only includes a quantized version of the channel direction 518, a codeword selection component 508 may select a codeword from a codebook 504 by maximizing a utility function $M(w_i)$ 514 such as the one provided above in equation (8) or the one provided above in equation (9).

The carrier to caused interference metric is one of the possible candidates for distributed beamforming decisions at base stations. This metric has been chosen because it may achieve a globally optimal solution through a distributed decision format in high SNRs (which is usually the case in the new generations of wireless cellular systems). Other metric functions which are monotonically decreasing with caused interference and monotonically increasing with signal power can replace the proposed metric and based on the merits of each, may have similar performance characteristics.

The size of the codebook may be expressed as $2^n$. The size of the codebook may be an optimization parameter. For high SNRs, increasing the size of the codebook may improve the performance of the system.

Existing systems may assume that the transmitted power from each transmit antenna at the base station is the same. It may be possible to assume a total transmit power constraint which translates to beamforming vectors with unit norm and power variations across different antennas.

One reason for fixing the power transmitted from each antenna may be to avoid difficulties arising from a large range of power transmission over identical antennas. To reach a compromise between the implementation limitations and the necessity of capturing the fading variations across different antennas, it may be beneficial to design codebooks that do not assume the same transmit power per antenna. These codebooks may allow for predetermined power variations across antennas. For example, there can be two different power levels for each transmit antenna.

In existing systems a diagonal random phase matrix may be generated first and may be multiplied by a Discrete Fourier Transform (DFT) matrix. The $w_i$ terms may be chosen as the column of the product of the DFT and diagonal random phase matrices, i.e., $\Omega$.

$$\Omega = \begin{bmatrix} e^{j\phi_1} & 0 & \cdots & 0 \\ 0 & e^{j\phi_2} & 0 & \vdots \\ \vdots & 0 & \ddots & 0 \\ 0 & \cdots & 0 & e^{j\phi_N} \end{bmatrix} \cdot \frac{1}{\sqrt{N}} [e^{j\frac{2\pi mn}{N}}], m, n = 0, \ldots, N-1 \quad (12)$$

The entries of the $w_i$ terms are all constant norm.

The per entry unit norm constraint can be relaxed to unit norm for the whole vector. In this case the $w_i$ terms may be a column of $\Omega$, where $[\Omega,S,V]=SVD(G)$ and $G$ is a matrix with random complex entries with a unit norm complex Gaussian distribution. Therefore, although there exist power variations across antennas, the codewords (i.e., the $w_i$ terms) may be unit norm.

The present disclosure also proposes a scheme that allows for fixed power variations across the entries of codebooks. It may be assumed that L power levels are allowed for each antenna.

$$\tilde{w}_i = \begin{bmatrix} l_1 \\ l_2 \\ \vdots \\ l_N \end{bmatrix} \cdot w_i / Norm \left( \begin{bmatrix} l_1 \\ l_2 \\ \vdots \\ l_N \end{bmatrix} \cdot w_i \right), l_i \in \{P_1, P_2, \ldots, P_L\} \quad (13)$$

where ● is the Hadamard (pairwise) product and $w_i$ is the codeword. Therefore this scheme may add another dimension to the existing codebook by adding $\log_2$ (L) more bits of information to the structure of each codeword. If the total number of bits is fixed, there is a trade-off between the number of bits assigned to amplitude feedback (e.g., $\log_2$ (L) bits), in contrast to direction feedback (n bits; where the size of $w_i$ codebook is $2^n$).

Figure 6:
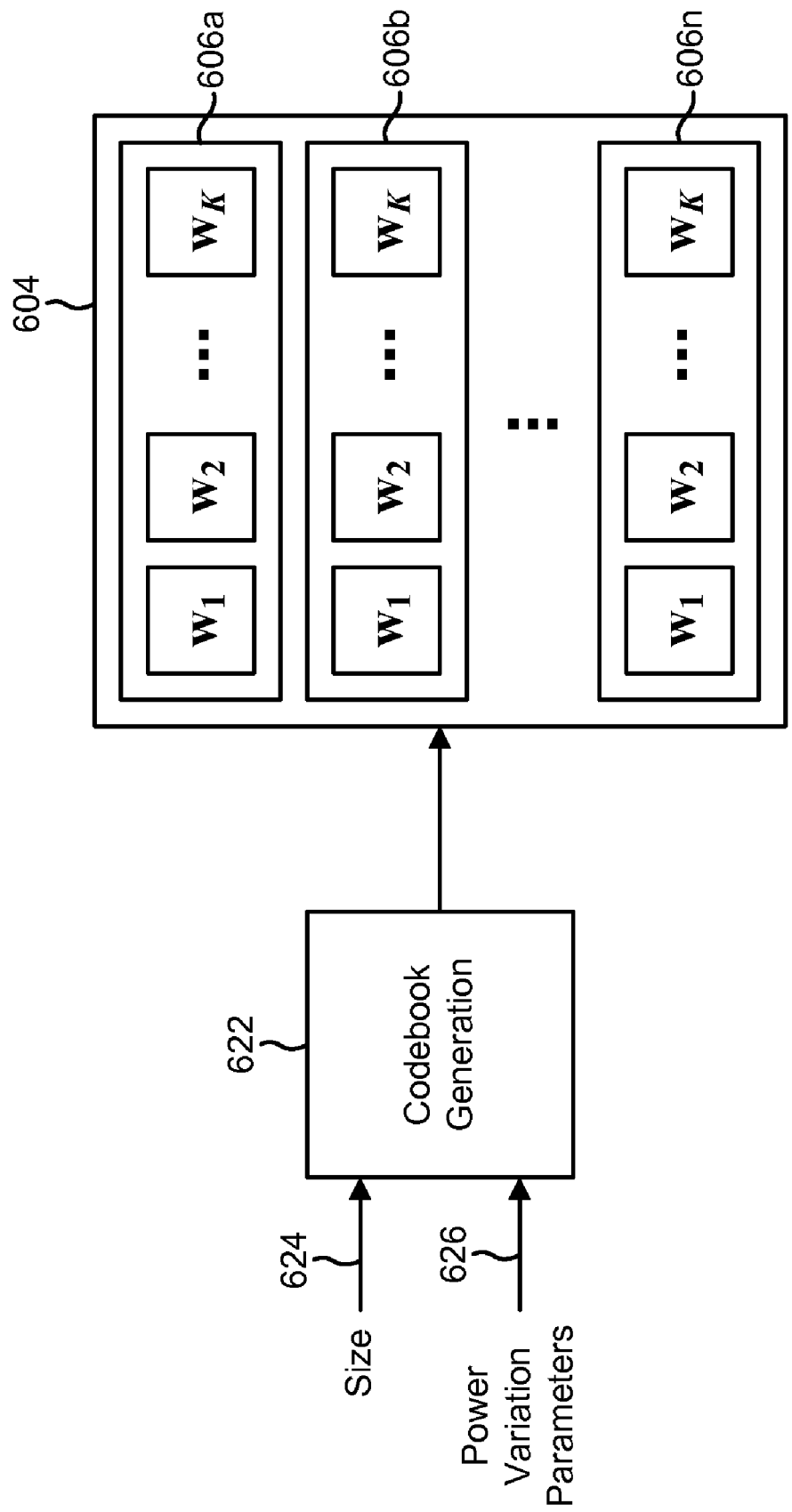
FIG. 6 shows certain parameters that may be taken into consideration when a codebook is generated.

FIG. 6 shows certain parameters that may be taken into consideration when a codebook 604 is generated. The codebook 604 is shown with multiple (e.g., $2^n$) codewords 606a, 606b, 606n.

As indicated above, the size 624 of the codebook 604 may be an optimization parameter. Increasing the size of the codebook may improve the performance of the system, particularly for high SNRs.

In addition, power variation parameters 626 may be taken into consideration when a codebook 604 is generated. The power variation parameters 626 may indicate, e.g., whether the codebook 604 allows for power variations across antennas, whether codewords 606 within the codebook 604 are unit norm, whether the power variations are fixed, etc.

In the above discussion, it was assumed that each user has one receive antenna (i.e., M=1). However, at least some of the users may have multiple receive antennas (i.e., M≧2). In this case, there may exist a combining vector u at the receiver. In the case of M=2, SINRI and M($w_i$) may be expressed as:

$$SINR_i = \frac{|u_i h_{ii} w_i|^2 P_i}{\sum_{j \neq i} |u_j h_{ji} w_j|^2 P_j + N_i} \quad (14)$$

$$M(w_i) = \frac{|u_i h_{ii} w_i|^2 P_i / N_i}{\sum_{j \neq i} |u_j h_{ij} w_i|^2 P_i / N_j + 1} \quad (15)$$

Methods similar to the ones discussed above may apply where at least some of the users have multiple receive antennas. One difference may be that there may be two optimization variables, the terms u and w. While the base station may take u for granted and find the optimal beamforming vector w, the receiver may find the optimal receive filter u. The receive filter u can be adopted as either a matched filter or a minimum mean-square error (MMSE) receive filter.

In such a set up the receiver can assume that the users are using dominant eigenvectors or matched filters as their receiver filters. (Assuming that the MMSE receiver filter is applied at the user may need the knowledge of the channels between that user and its other interfering base stations. Feeding back this information can be impractical.) After assuming the receive filter, the base station may find the MMSE solution that maximizes the metric above. This $w_i^*$ may be used for the transmission to the user i. The user can apply an MMSE receive filter to maximize its SINR (shown above), which gives $u_i^*$.

This process can be continued iteratively. The next time the user feeds back the equivalent channel $u_i h_{ij}$ to the base station i. Therefore, the base station can find the $w_i^*$ with precision. After the next transmission the user again finds the optimal $u_i^*$ based on the equivalent downlink channel. This process can be repeated until it converges to a steady state.

Figure 7:
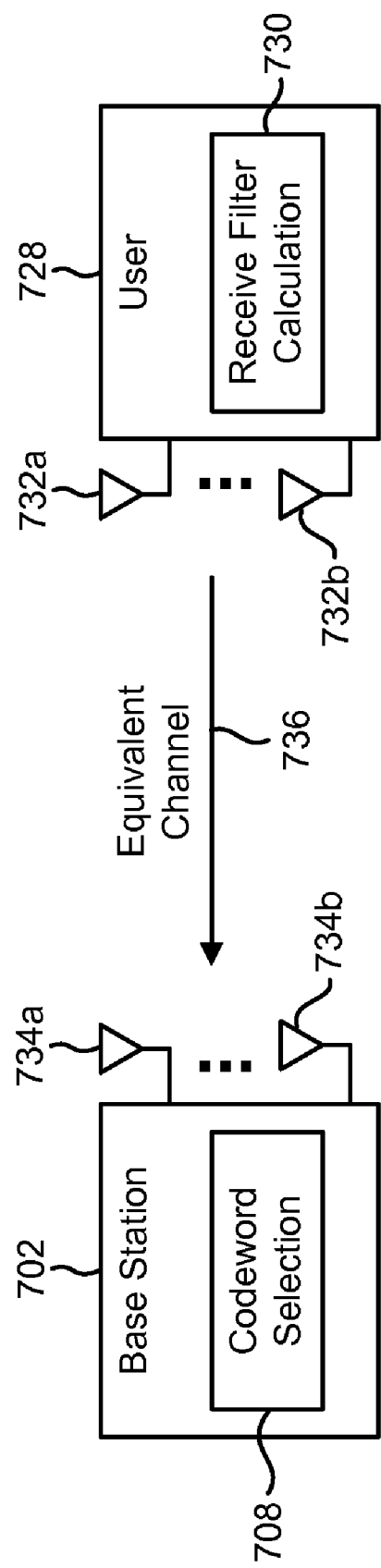
FIG. 7 illustrates interaction between a base station and a mobile station that has multiple antennas.

FIG. 7 shows a base station 702 with multiple antennas 734a, 734b and a user (mobile station) 728 with multiple antennas 732a, 732b. A codeword selection component 708 at the base station 702 may assume the receive filter and find the MMSE solution that maximizes the metric above. This $w_i^*$ may be used for the transmission to the user 728. A receive filter calculation component 730 at the user 728 may then apply an MMSE receive filter to maximize its SINR (shown above), which gives $u_i^*$. Then, the user may feed back the equivalent channel 736 to the base station 702. As indicated above, this process can be repeated until it converges to a steady state.

FIG. 8 illustrates a method 800 for distributed beamforming based on carrier to caused interference. In accordance with the method 800, channel state information may be received 802 from users. The channel state information may be full channel state information. Alternatively, the channel state information may consist of a quantized version of the channel and the amplitude of the channel. Alternatively still, the channel state information may consist of the quantized version of the channel.

A transmit beamforming vector ($w_i$) may be determined 804 based on maximizing a utility function M($w_i$) that includes a signal-to-caused-interference-plus-noise ratio. As discussed above, the utility function M($w_i$) may have different forms depending on the channel state information that is received.

There are several ways that the transmit beamforming vector may be determined 804. For example, the transmit beamforming vector may be determined by selecting a codeword from a codebook. Alternatively, the transmit beamforming vector may be calculated (e.g., based on solving equation (6) above). Once a particular transmit beamforming vector has been determined 804, the transmit beamforming vector may be used 806 for beamforming.

The method 800 of FIG. 8 described above may be performed by various hardware and/or software component(s) and/or module(s) corresponding to the means-plus-function blocks 900 illustrated in FIG. 9. In other words, blocks 802 through 806 illustrated in FIG. 8 correspond to means-plus-function blocks 902 through 906 illustrated in FIG. 9.

Figure 10:
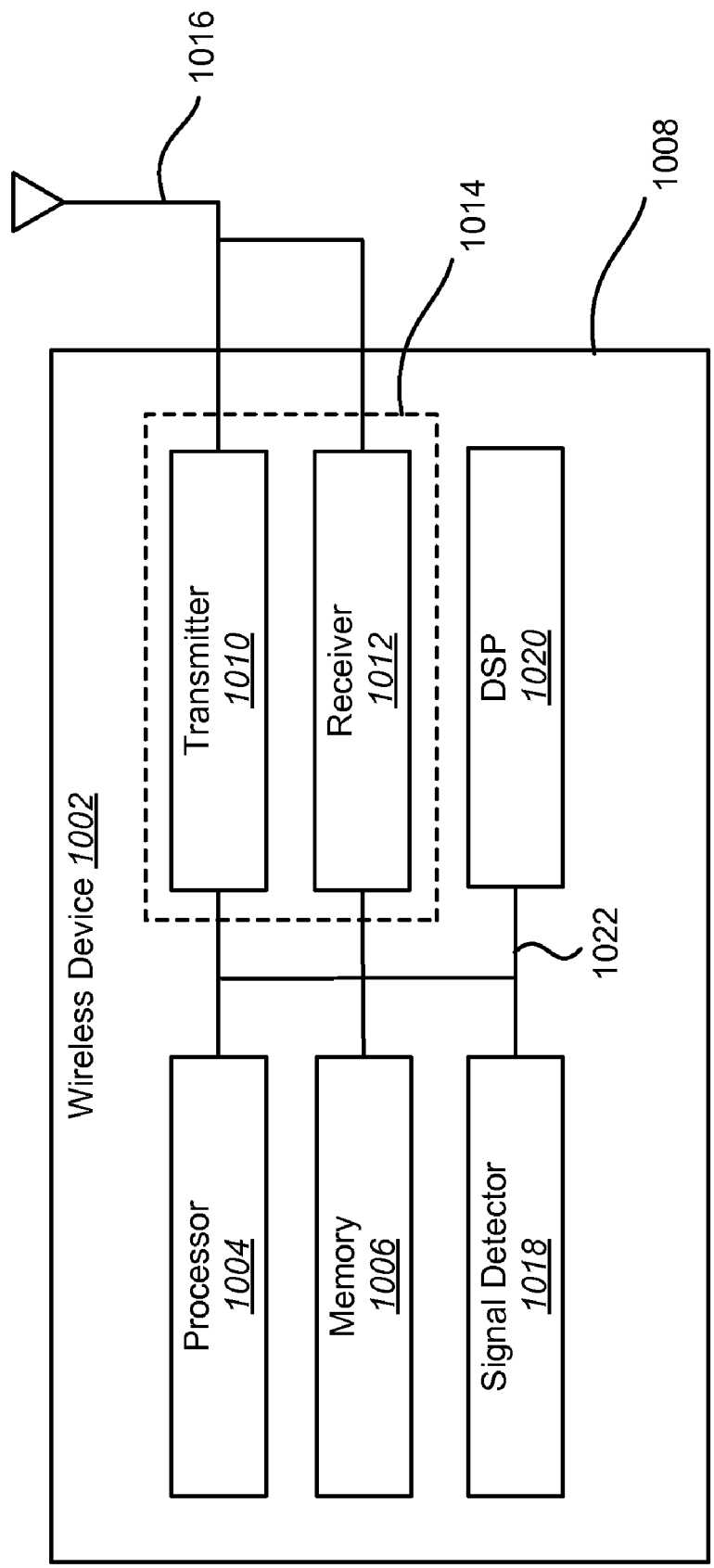
FIG. 10 illustrates various components that may be utilized in a wireless device.

FIG. 10 illustrates various components that may be utilized in a wireless device 1002. The wireless device 1002 is an example of a device that may be configured to implement the various methods described herein. The wireless device 1002 may be a base station or a mobile station.

The wireless device 1002 may include a processor 1004 which controls operation of the wireless device 1002. The processor 1004 may also be referred to as a central processing unit (CPU). Memory 1006, which may include both read-only memory (ROM) and random access memory (RAM), provides instructions and data to the processor 1004. A portion of the memory 1006 may also include non-volatile random access memory (NVRAM). The processor 1004 typically performs logical and arithmetic operations based on program instructions stored within the memory 1006. The instructions in the memory 1006 may be executable to implement the methods described herein.

The wireless device 1002 may also include a housing 1008 that may include a transmitter 1010 and a receiver 1012 to allow transmission and reception of data between the wireless device 1002 and a remote location. The transmitter 1010 and receiver 1012 may be combined into a transceiver 1014. An antenna 1016 may be attached to the housing 1008 and electrically coupled to the transceiver 1014. The wireless device 1002 may also include (not shown) multiple transmitters, multiple receivers, multiple transceivers and/or multiple antennas.

The wireless device 1002 may also include a signal detector 1018 that may be used to detect and quantify the level of signals received by the transceiver 1014. The signal detector 1018 may detect such signals as total energy, pilot energy per pseudonoise (PN) chips, power spectral density, and other signals. The wireless device 1002 may also include a digital signal processor (DSP) 1020 for use in processing signals.

The various components of the wireless device 1002 may be coupled together by a bus system 1022 which may include a power bus, a control signal bus, and a status signal bus in addition to a data bus. However, for the sake of clarity, the various buses are illustrated in FIG. 10 as the bus system 1022.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIG. 8, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
   receiving channel state information from users at least partially in response to transmission of a first beam from a base station;
   selecting a codeword to increase a carrier-to-caused-interference-plus-noise ratio of a second beam transmitted from the base station based, at least in part, on the received channel state information, wherein the carrier-to-caused-interference-plus-noise ratio is determined based at least in part on a ratio of carrier signal power of the second transmitted beam versus noise plus interference caused at least in part by the second transmitted beam;
   determining a transmit beamforming vector based at least in part on the codeword; and
   using the transmit beamforming vector for beamforming at least partially to generate the second transmitted beam; and
   iteratively selecting codewords to increase carrier-to-caused-interference-plus-noise ratio of at least one beam subsequently transmitted from the base station based, at least in part, on channel state information received at least partially in response to transmission of the second beam from the base station.

2. The method of claim 1, wherein the codeword is selected from a codebook.

3. The method of claim 2, wherein a size of the codebook is a variable parameter.

4. The method of claim 2, wherein the codebook allows for power variations across antennas.

5. The method of claim 4, wherein each codeword within the codebook is unit norm.

6. The method of claim 4, wherein the power variations are fixed.

7. The method of claim 1, wherein determining the transmit beamforming vector comprises calculating the transmit beamforming vector.

8. The method of claim 7, wherein the transmit beamforming vector is calculated based at least in part on a determination of $$w_i^* = \frac{(I+B)^{-1} h_{ii}}{\|(I+B)^{-1} h_{ii}\|},$$

wherein $w_i^*$ denotes the beamforming vector, $h_{ii}$ denotes channel coefficients, I denotes an identity matrix, and $$B = \sum_{j \neq i} h_{ij}^H h_{ij} \cdot P_i / N_j,$$

wherein $h_{ij}^H$ and $h_{ij}$ denote channel coefficients, Pi denotes signal power, and Nj denotes number of antennas.

9. The method of claim 1, wherein a caused interference to each user is scaled by one or more weighting factors.

10. The method of claim 9, wherein the scaling comprises:

$$M(w_i) = \frac{|h_{ii} w_i|^2 P_i}{\sum_{j \neq i} \alpha_{ij} |h_{ij} w_i|^2 P_i + \alpha_0 N},$$

wherein $w_i$ denotes the beamforming vector, $M(w_i)$ denotes a utility function, $h_{ii}$ and $h_{ij}$ denote channel coefficients, $P_i$ denotes signal power transmitted by user i, N denotes a number of transmit antennas, and $\alpha_{ij}$ and $\alpha_0$ comprise weighting factors.

11. The method of claim 1, wherein full channel state information is received from the users.

12. The method of claim 1, wherein the channel state information that is received comprises a quantized version of a channel direction and an amplitude of a channel.

13. The method of claim 1, wherein the channel state information that is received comprises a quantized version of a channel direction.

14. The method of claim 1, wherein at least some of the users have multiple receive antennas.

15. The method of claim 1, wherein the interference caused at least in part by the transmitted beam is determined based at least in part on the channel state information received from users.

16. A base station, comprising:
   a processor;
   memory in electronic communication with the processor;
   instructions stored in the memory, the instructions being executable by the processor to:
   process channel state information received from users at least partially in response to transmission of a first beam from the base station;
   select a codeword to increase a carrier-to-caused-interference-plus-noise ratio of a second beam transmitted from the base station based, at least in part, on the received channel state information, wherein the carrier-to-caused-interference-plus-noise ratio is determined based at least in part on a ratio of carrier signal power of the second transmitted beam versus noise plus interference caused at least in part by the second transmitted beam;
   determine a transmit beamforming vector based at least in part on the codeword;
   use the transmit beamforming vector for beamforming at least partially to generate the second transmitted beam; and
   iteratively select codewords to increase carrier-to-caused-interference-plus-noise ratio of at least one beam subsequently transmitted from the base station based, at least in part, on channel state information received at least partially in response to transmission of the second beam from the base station.

17. The base station of claim 16, wherein the codeword is selected from a codebook.

18. The base station of claim 17, wherein a size of the codebook is a variable parameter.

19. The base station of claim 17, wherein the codebook allows for power variations across antennas.

20. The base station of claim 19, wherein each codeword within the codebook is unit norm.

21. The base station of claim 19, wherein the power variations are fixed.

22. The base station of claim 16, wherein determining the transmit beamforming vector comprises calculating the transmit beamforming vector.

23. The base station of claim 22, wherein the transmit beamforming vector is calculated at least in part on a determination of $$w_i^* = \frac{(I+B)^{-1}h_{ii}}{\|(I+B)^{-1}h_{ii}\|},$$

wherein $w_i^*$ denotes the beamforming vector, $h_{ii}$ denotes channel coefficients, I denotes an identity matrix, and $$B = \sum_{j \neq i} h_{ij}^H h_{ij} \cdot P_i / N_j,$$

wherein $h_{ij}^H$ and $h_{ij}$ denote channel coefficients, Pi denotes signal power, and Nj denotes number of antennas.

24. The base station of claim 16, wherein a caused interference to each user is scaled by one or more weighting factors.

25. The base station of claim 24, wherein the scaling comprises:

$$M(w_i) = \frac{|h_{ii}w_i|^2 P_i}{\sum_{j \neq i} \alpha_{ij}|h_{ij}w_i|^2 P_i + \alpha_0 N},$$

wherein $w_i$ denotes the beamforming vector, $M(w_i)$ denotes a utility function, $h_{ii}$ and $h_{ij}$ denote channel coefficients, $P_i$ denotes signal power transmitted by user i, N denotes a number of transmit antennas, and $\alpha_{ij}$ and $\alpha_0$ comprise weighting factors.

26. The base station of claim 16, wherein full channel state information is received from the users.

27. The base station of claim 16, wherein the channel state information that is received comprises a quantized version of a channel direction and an amplitude of a channel.

28. The base station of claim 16, wherein the channel state information that is received comprises a quantized version of a channel direction.

29. The base station of claim 16, wherein at least some of the users have multiple receive antennas.

30. An apparatus comprising:
   means for receiving channel state information from users at least partially in response to transmission of a first beam from a base station;
   means for selecting a codeword to increase a carrier-to-caused-interference-plus-noise ratio of a second beam transmitted from the base station based, at least in part, on the received channel state information, wherein the carrier-to-caused-interference-plus-noise ratio is determined based at least in part on a ratio of carrier signal power of the second transmitted beam versus noise plus interference caused at least in part by the second transmitted beam;
   means for determining a transmit beamforming vector based at least in part on the codeword;
   means for using the transmit beamforming vector for beamforming at least partially to generate the second transmitted beam; and
   means for iteratively selecting codewords to increase carrier-to-caused-interference-plus-noise ratio of at least one beam subsequently transmitted from the base station based, at least in part, on channel state information received at least partially in response to transmission of the second beam from the base station.

31. The apparatus of claim 30, wherein the means for determining the transmit beamforming vector comprises means for selecting a codeword from a codebook.

32. The apparatus of claim 31, wherein a size of the codebook is a variable parameter.

33. The apparatus of claim 31, wherein the codebook allows for power variations across antennas.

34. The apparatus of claim 33, wherein each codeword within the codebook is unit norm.

35. The apparatus of claim 33, wherein the power variations are fixed.

36. The apparatus of claim 30, wherein the means for determining the transmit beamforming vector comprises means for calculating the transmit beamforming vector.

37. The apparatus of claim 36, wherein the transmit beamforming vector is calculated at least in part on a determination of $$w_i^* = \frac{(I+B)^{-1}h_{ii}}{\|(I+B)^{-1}h_{ii}\|},$$

wherein $w_i^*$ denotes the beamforming vector, $h_{ii}$ denotes channel coefficients, I denotes an identity matrix, and $$B = \sum_{j \neq i} h_{ij}^H h_{ij} \cdot P_i / N_j,$$

wherein $h_{ij}^H$ and $h_{ij}$ denote channel coefficients, Pi denotes signal power, and Nj denotes number of antennas.

38. The apparatus of claim 30, wherein a caused interference to each user is scaled by one or more weighting factors.

39. The apparatus of claim 38, wherein the scaling comprises:

$$M(w_i) = \frac{|h_{ii}w_i|^2 P_i}{\sum_{j \neq i} \alpha_{ij}|h_{ij}w_i|^2 P_i + \alpha_0 N},$$

wherein $w_i$ denotes the beamforming vector, $M(w_i)$ denotes a utility function, $h_{ii}$ and $h_{ij}$ denote channel coefficients, $P_i$ denotes signal power transmitted by user i, N denotes a number of transmit antennas, and $\alpha_{ij}$ and $\alpha_0$ comprise weighting factors.

40. The apparatus of claim 30, wherein full channel state information is received from the users.

41. The apparatus of claim 30, wherein the channel state information that is received comprises a quantized version of a channel direction and an amplitude of a channel.

42. The apparatus of claim 30, wherein the channel state information that is received comprises a quantized version of a channel direction.

43. The apparatus of claim 30, wherein at least some of the users have multiple receive antennas.

44. A non-transitory computer readable medium comprising computer-readable instructions stored thereon executable by one or more processors to:
   process channel state information received from users at least partially in response to transmission of a first beam from a base station;

select a codeword to increase a carrier-to-caused-interference-plus-noise ratio of a second beam transmitted from the base station based, at least in part, on the received channel state information, wherein the carrier-to-caused-interference-plus-noise ratio is determined based at least in part on a ratio of carrier signal power of the second transmitted beam versus noise plus interference caused at least in part by the second transmitted beam;

determine a transmit beamforming vector based at least in part on the codeword;

utilize the transmit beamforming vector for beamforming at least partially to generate the second transmitted beam; and iteratively select codewords to increase carrier-to-caused-interference-plus-noise ratio of at least one beam subsequently transmitted from the base station based, at least in part, on channel state information received at least partially in response to transmission of the second beam from the base station.

45. The non-transitory computer readable medium of claim 44, wherein the codeword is selected from a codebook.

46. The non-transitory computer readable medium of claim 45, wherein a size of the codebook is a variable parameter.

47. The non-transitory computer readable medium of claim 45, wherein the codebook allows for power variations across antennas.

48. The non-transitory computer readable medium of claim 47, wherein each codeword within the codebook is unit norm.

49. The non-transitory computer readable medium of claim 47, wherein the power variations are fixed.

50. The non-transitory computer readable medium of claim 44, wherein determining the transmit beamforming vector comprises calculating the transmit beamforming vector.

51. The non-transitory computer readable medium of claim 50, wherein the transmit beamforming vector is calculated at least in part on a determination of $$w_i^* = \frac{(I+B)^{-1} h_{ii}}{\|(I+B)^{-1} h_{ii}\|},$$

wherein $w_i^*$ denotes the beamforming vector, $h_{ii}$ denotes channel coefficients, I denotes an identity matrix, and $$B = \sum_{j \neq i} h_{ij}^H h_{ij} \cdot P_i / N_j,$$

wherein $h_{ij}^H$ and $h_{ij}$ denote channel coefficients, Pi denotes signal power, and Nj denotes number of antennas.

52. The non-transitory computer readable medium of claim 44, wherein a caused interference to each user is scaled by one or more weighting factors.

53. The non-transitory computer readable medium of claim 52, wherein the scaling comprises:

$$M(w_i) = \frac{|h_{ii} w_i|^2 P_i}{\sum_{j \neq i} \alpha_{ij} |h_{ij} w_i|^2 P_i + \alpha_0 N},$$

wherein $w_i$ denotes the beamforming vector, $M(w_i)$ denotes a utility function, $h_{ii}$ and $h_{ij}$ denote channel coefficients, $P_i$ denotes signal power transmitted by user i, N denotes a number of transmit antennas, and $\alpha_{ij}$ and $\alpha_0$ comprise weighting factors.

54. The non-transitory computer readable medium of claim 44, wherein full channel state information is received from the users.

55. The non-transitory computer readable medium of claim 44, wherein a channel state information that is received comprises a quantized version of a channel direction and an amplitude of the channel.

56. The non-transitory computer readable medium of claim 44, wherein the channel state information that is received comprises a quantized version of a channel direction.

57. The non-transitory computer readable medium of claim 44, wherein at least some of the users have multiple receive antennas.

58. A method comprising:

receiving channel state information (CSI) from a plurality of user devices in response to transmission of a first beam;

selecting, at a base station, a codeword based on the CSI received from the plurality of user devices, wherein the codeword results in a carrier-to-caused-interference-plus-noise ratio associated with a second beam having a greater value than a carrier-to-caused-interference-plus-noise ratio associated with the first beam, wherein the carrier-to-caused-interference-plus-noise ratio associated with the second beam is determined based on a ratio of carrier signal power of the second beam to noise plus interference caused by the second beam;

determining, at the base station, a transmit beamforming vector based on the codeword; and beamforming, at the base station, using the transmit beamforming vector.

59. The method of claim 58, wherein the codeword is selected from a codebook that includes a plurality of selectable codewords, and wherein a number of selectable codewords in the codebook is a variable parameter.

60. The method of claim 59, wherein determining the transmit beamforming vector comprises calculating the transmit beamforming vector.

61. A base station, comprising:

a processor;

memory in electronic communication with the processor;

instructions stored in the memory, the instructions being executable by the processor to:

process channel state information (CSI) received from a plurality of user devices in response to transmission of a first beam;

select a codeword based on the CSI received from the plurality of user devices, wherein the codeword results in a carrier-to-caused-interference-plus-noise ratio associated with a second beam having a greater value than a carrier-to-caused-interference-plus-noise ratio associated with the first beam, wherein the carrier-to-caused-interference-plus-noise ratio associated with the second beam is determined based on a ratio of carrier signal power of the second beam to noise plus interference caused by the second beam;

determine a transmit beamforming vector based at least in part on the codeword; and use the transmit beamforming vector for beamforming.

62. The base station of claim 61, wherein the codeword is selected from a codebook.

63. The base station of claim 61, wherein determining the transmit beamforming vector comprises calculating the transmit beamforming vector.

64. An apparatus comprising:
means for receiving channel state information (CSI) from a plurality of user devices in response to transmission of a first beam;
means for selecting a codeword based on the CSI received from the plurality of user devices, wherein the codeword results in a carrier-to-caused-interference-plus-noise ratio associated with a second beam having a greater value than a carrier-to-caused-interference-plus-noise ratio associated with the first beam, wherein the carrier-to-caused-interference-plus-noise ratio associated with the second beam is determined based on a ratio of carrier signal power of the second beam to noise plus interference caused by the second beam;
means for determining a transmit beamforming vector based at least in part on the codeword; and
means for using the transmit beamforming vector for beamforming.

65. The apparatus of claim 64, wherein the codeword is selected from a codebook.

66. The apparatus of claim 64, wherein the means for determining the transmit beamforming vector comprises means for calculating the transmit beamforming vector.

67. A non-transitory computer readable medium comprising computer-readable instructions stored thereon executable by one or more processors to:
process channel state information (CSI) received from a plurality of user devices in response to transmission of a first beam;
select a codeword based on the CSI received from the plurality of user devices, wherein the codeword results in a carrier-to-caused-interference-plus-noise ratio associated with a second beam having a greater value than a carrier-to-caused-interference-plus-noise ratio associated with the first beam, wherein the carrier-to-caused-interference-plus-noise ratio associated with the second beam is determined based on a ratio of carrier signal power of the second beam to noise plus interference caused by the second beam;
determine a transmit beamforming vector based at least in part on the codeword; and
utilize the transmit beamforming vector for beamforming.

68. The non-transitory computer readable medium of claim 67, wherein the codeword is selected from a codebook.

69. The non-transitory computer readable medium of claim 67, wherein determining the transmit beamforming vector comprises calculating the transmit beamforming vector.

70. A method comprising:
receiving, at a base station, channel state information (CSI) from a plurality of user devices in response to transmission of a first beam from a base station;
selecting, at the base station, a first codeword based on the CSI received from the plurality of user devices, wherein the first codeword results in a carrier-to-caused-interference-plus-noise ratio associated with a second beam having a greater value than a carrier-to-caused-interference-plus-noise ratio associated with the first beam;
transmitting the first beam from the base station, wherein the first beam is beamformed based on the first codeword;
receiving, at the base station, updated CSI from the plurality of user devices in response to transmission of the second beam from the base station;
selecting, at the base station, a second codeword based on the updated CSI received from the plurality of user devices, wherein the second codeword results in, a carrier-to-caused-interference-plus-noise ratio associated with a third beam having a greater value than a carrier-to-caused-interference-plus-noise ratio associated with the second beam; and
transmitting the second beam from the base station, wherein the second beam is beamformed based on the second codeword;
wherein a carrier-to-caused-interference-plus-noise ratio associated with a transmitted beam is determined based on a ratio of carrier signal power of the transmitted beam to noise plus interference caused by the transmitted beam.

* * * * *